United States Patent [19]

Chanzy et al.

[11] Patent Number: 4,880,469

[45] Date of Patent: Nov. 14, 1989

[54] PROCESS FOR THE PREPARATION OF A SHAPEABLE SOLUTION OF CELLULOSE IN THE PRESENCE OF A TERTIARY AMINE OXIDE AND AN ADDITIVE

[75] Inventors: Henri D. Chanzy, La Tronche; Michel Paillet, Grenoble, both of France

[73] Assignees: Institut Textile de France, Boulogne Billancourt Cedex; Centre de Recherche Scientifique, Paris, both of France

[21] Appl. No.: 211,575

[22] Filed: Jun. 27, 1988

[30] Foreign Application Priority Data

Jul. 1, 1987 [FR]  France ................................ 87 09583

[51] Int. Cl.$^4$ ........................... C08L 1/00; D01F 9/00
[52] U.S. Cl. .................................... 106/203; 264/186; 264/187
[58] Field of Search ........................... 106/203; 8/196; 264/186, 187

[56] References Cited

U.S. PATENT DOCUMENTS

| | | | |
|---|---|---|---|
| 4,302,252 | 11/1981 | Turbak et al. | 106/203 |
| 4,324,593 | 9/1978 | Varga | 106/203 |

FOREIGN PATENT DOCUMENTS

| | | |
|---|---|---|
| 868737 | 11/1978 | Belgium . |
| 2578865 | 9/1986 | France . |
| 158656 | 1/1983 | German Democratic Rep. . |
| 218104 | 1/1985 | German Democratic Rep. . |

OTHER PUBLICATIONS

Chem. Abst.: 56:3696g, "Geiger, E. et al. " 1961.
Chem. Abst.: 58:10335f, "Modi et al." 1963.

*Primary Examiner*—Theodore Morris
*Attorney, Agent, or Firm*—Sheiner & O'Connor

[57] ABSTRACT

The invention relates to solutions of cellulose destined to be extruded or spun, containing a tertiary amine oxide as solvent for the cellulose and in particular the N-oxide of N-methylmorpholine. It consists of using ammonium chloride or calcium chloride as additive in the preparation of these solutions.

5 Claims, No Drawings

PROCESS FOR THE PREPARATION OF A SHAPEABLE SOLUTION OF CELLULOSE IN THE PRESENCE OF A TERTIARY AMINE OXIDE AND AN ADDITIVE

The present invention relates to the preparation of a solution of cellulose destined to be extruded or spun, this solution containing a tertiary or amine oxide as solvent for the cellulose; it also relates to the process for shaping the solution thus prepared as well as to the cellulose fibers and filaments thus obtained.

The utilization of a tertiary amine oxide to dissolve cellulose in order to prepare an extrusion or spinning solution is known, for example from the patent from the U.S. of America U.S. Pat. Nos. 2,179,181 and 3,447,939. This latter document in particular describes the utilization of the N-oxide of N-methylmorpholine, designated in the remainder of this description by NMMO, as solvent for cellulose.

To the knowledge of the applicants, the fibers of regenerated cellulose obtained by spinning starting from solutions containing amine oxides such as NMMO exhibit mechanical properties superior to those of conventional regenerated celluloses, but markedly inferior to those of high performance fibers currently on the market. Furthermore, since spinning is performed when the solution of cellulose is at a relatively high temperature, this may entail a partial degradation of the cellulose and thus of the mechanical properties of the fibers obtained.

Now a process for the preparation of a solution of cellulose starting from a tertiary amine oxide has been found which obviates the observed disadvantages and this is the subject of the invention. On the one hand, the fibers obtained exhibit improved mechanical properties under the usual conditions of spinning and, on the other, it is possible to spin at lower temperatures. According to the process of the invention, ammonium chloride or calcium chloride is added as additive to the mixture of the tertiary amine oxide.

Thus, in a quite unexpected manner, it has been observed that the addition of either ammonium chloride or calcium chloride to the solution of cellulose/tertiary amine oxide increased appreciably the Young's modulus, the tenacity and/or the extension at break of the fibers obtained compared to the same properties of the fibers obtained starting from solutions of cellulose without additives.

The increase in the mechanical properties observed is a function of the degree of polymerization (DP) of the cellulose used in the solution, its concentration and the concentration of the additive.

In the case of the cellulose of DP 5000, the amount by weight of ammonium chloride in the solution is preferably more than 1.5 times the amount of cellulose. In the case of calcium chloride, this quantity is equal to or greater than 0.5 times the amount of cellulose, and preferably an equivalent amount.

In the case of the cellulose of DP 600, the amount by weight of ammonium chloride in the solution lies preferably between 10 and 250% of the amount of cellulose.

In an equally unexpected manner, it has been observed that the addition of either ammonium chloride or calcium chloride to the solution of cellulose/tertiary amine oxide made it possible to reduce the temperature of the solution appreciably during spinning. The reduction in temperature thus observed was by several tens of degrees compared with the lowest acceptable temperatures for the spinning of solution without additive.

Another distinctive feature of the invention resides in the change in the solubility of the cellulose in the solvent in the presence of the additive. This solubility diminishes but, in contrast, the viscosity of the solution increases and this makes it possible to spin very satisfactorily solutions of cellulose in which the cellulose concentrations are low. Thus, another subject of the invention is to propose a process for spinning a solution of cellulose in a tertiary amine oxide which is characterized by the fact that the solution has a concentration of cellulose varying between 2 and 10% and a concentration of ammonium chloride or calcium chloride varying between 12 and 2%, respectively.

The invention will be better understood by reading the description which will be made of examples of embodiments of a cellulose solution in a tertiary amine oxide with ammonium chloride or calcium chloride as additive. The starting material is a pure cellulose, obtained from MENOUFI cotton, having a degree of polymerization of 5000.

In order to prepare the solution, the oxide of N-methyl morpholine (NMMO) containing 40% of water and supplied by the TEXACO company, is mixed with the amount of cellulose and N-propyl gallate is added as antioxidant and ammonium chloride or calcium chloride as additive. The suspension obtained is placed in a BUCHI Rotavapor in which a vacuum of 10 mm of mercury is generated. The suspension is heated at 100° C. for 7 minutes, then the vacuum is released and the solution is heated at 130° C. for 5 minutes.

The spinning of the solution thus prepared is carried out with the aid of a machine from the DAVENPORT company equipped with a heating cylinder, a piston 1 centimeter square and dies with a single aperture, the diameter of which may vary from 300 microns to 500 microns. Spinning takes place at temperatures which may vary from ambient temperature to 130° C. It is done in air. The spinning solution, also known as collodion, is fed into a coagulation tank filled with water, with or without additive. The distance between the die and the coagulation tank is about 10 to 15 centimeters. The pressure exerted on the piston is 2.7 kg/cm$^2$ but may be increased up to 50 kg/cm$^2$ for very viscous solutions, in particular when spinning is done at the lowest temperatures. The fiber obtained is drawn into the coagulation tank, it passes via a transmission system and then is wound at speeds varying between 20 and 200 meters per minute.

All of the additives, including the antioxidant, are removed by washing with running water, then the fibers are dried in air. The measurement of the counts is usually performed with the aid of a vibroscope from the CENTRALP AUTOMATISME company coupled to a frequency meter. The measurements of the mechanical properties of the fibers, namely Young's modulus, the breaking load and the extension at the break are performed with the aid of an INSTRON device.

The following examples give the values for the mechanical properties measured for fibers derived from different spinning solutions.

EXAMPLE 1

The additive used is calcium chloride. Table 1 below gives the values of three mechanical properties: Young's modulus (in GPA), the tenacity or breaking load (in GPA) and the extension at break (in %) for different concentrations of calcium chloride in the solution. The spinning solution is a 2% solution of cellulose of DP 5000 in NMMO.

TABLE 1

| Cellulose DP 5000 | Modulus | Tenacity | Extension |
|---|---|---|---|
| no additive | 40 | 0.85 | 4.0 |
| Ca Cl$_2$ 1% | 45 | 0.85 | 3.5 |
| 2% | 55 | 0.95 | 2.6 |
| 5% | 45 | 1.0 | 4.0 |
| 7% | 48 | 0.9 | 4.7 |

EXAMPLE 2

The additive used is ammonium chloride. The spinning solution has the same composition as that in example 1. The values for the mechanical properties are given in table 2.

TABLE 2

| Cellulose DP 5000 | Modulus | Tenacity | Extension |
|---|---|---|---|
| no additive | 40 | 0.85 | 4.0 |
| NH$_4$ Cl 1% | 39 | 0.6 | 3.1 |
| 2% | 37 | 0.7 | 4.5 |
| 3.5% | 55 | 1.35 | 5.0 |
| 5% | 53 | 1.20 | 5.4 |

Improvement of the mechanical properties is only obtained for concentrations of ammonium chloride higher than about 3%.

EXAMPLE 3

In contrast to the two previous examples, the starting material is a cellulose having a content of 95% of alpha-cellulose and a degree of polymerization of 600. This cellulose is available in the form of a paste, reference V60, from the BUCKEYE company. The paste is disintegrated in the dry state with the aid of a device equipped with a sieve having holes of 1 millimeter diameter. The conditions for the preparation of the solution and for spinning are the same as those which have been described above; however, the concentration in the spinning solution of cellulose and ammonium chloride are varied simultaneously. Table 3 below gives the values of the mechanical properties obtained.

TABLE 3

| Cellulose DP 600 | NH$_4$ Cl | Modulus | Tenacity | Extension |
|---|---|---|---|---|
| 10% | 0 | 21 | 0.5 | 16.5 |
| 14% | 2% | 36 | 1 | 12 |
| 10% | 4% | 36 | 0.8 | 7 |
| 4% | 10% | 31 | 0.7 | 5.8 |

A very considerable improvement in the Young's modulus and the tenacity are noted which contrast with the marked diminution in the extension at break.

It is observed that a spinning solution with very low concentrations of cellulose can be spun in a quite satisfactory manner owing to the addition of ammonium chloride.

The invention is not limited only to the examples described above, in particular it relates to all types of cellulose and not only to celluloses exhibiting a DP of 5000 or 600.

We claim:

1. Process for the preparation of a cellulose solution destined to be extruded or spun, of the type in which is used as solvent for the cellulose a tertiary amine oxide characterized in that ammonium chloride or calcium chloride is added to the mixture of the tertiary amine oxide and cellulose.

2. Process according to claim 1, characterized in that for a cellulose having a degree of polymerization of the order of 5000, the amount of ammonium chloride is greater than 1.5 times the amount of cellulose.

3. Process according to claim 1, characterized in that for a cellulose having a degree of polymerization of the order of 5000, the amount of calcium chloride is equal to or greater than 0.5 times the amount of cellulose, and preferably is equal to the amount of cellulose.

4. Process according to claim 1, characterized in that for a cellulose having a degree of polymerization of the order of 600, the amount of ammonium chloride varies between 0.10 and 2.5 times the amount of cellulose.

5. Process for spinning a cellulose solution in a tertiary amine oxide, characterized in that the cellulose concentration of the solution lies between 2 and 10% and the ammonium chloride or calcium chloride concentration varies between 12 and 2%.

* * * * *